United States Patent
Shahidzadeh et al.

(10) Patent No.: US 8,375,380 B2
(45) Date of Patent: *Feb. 12, 2013

(54) IN-SYSTEM RECONFIGURING OF HARDWARE RESOURCES

(75) Inventors: Shahrokh Shahidzadeh, Beaverton, OR (US); William J. Kirby, Portland, OR (US); Jonathan P. Douglas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 612 days.

This patent is subject to a terminal disclaimer.

(21) Appl. No.: 12/615,325

(22) Filed: Nov. 10, 2009

(65) Prior Publication Data
US 2010/0058323 A1 Mar. 4, 2010

Related U.S. Application Data

(63) Continuation of application No. 11/135,158, filed on May 23, 2005, now Pat. No. 7,640,541.

(51) Int. Cl.
*G06F 9/44* (2006.01)
*G06F 9/45* (2006.01)
(52) U.S. Cl. .................. 717/168; 717/120; 717/169
(58) Field of Classification Search .......... 717/120–121, 717/131–132, 168–172; 709/209, 203–204
See application file for complete search history.

(56) References Cited

U.S. PATENT DOCUMENTS

| | | | | |
|---|---|---|---|---|
| 5,530,749 A * | 6/1996 | Easter et al. | ........... | 713/191 |
| 5,771,287 A | 6/1998 | Gilley et al. | ........... | 713/191 |
| 6,279,153 B1 * | 8/2001 | Bi et al. | ........... | 717/171 |
| 6,671,713 B2 * | 12/2003 | Northrup | ........... | 709/203 |
| 6,687,734 B1 * | 2/2004 | Sellink et al. | ........... | 709/203 |
| 6,698,018 B1 * | 2/2004 | Zimniewicz et al. | ........... | 717/175 |
| 6,954,777 B1 * | 10/2005 | Fields et al. | ........... | 709/203 |
| 7,020,598 B1 * | 3/2006 | Jacobson | ........... | 703/14 |
| 7,133,874 B2 * | 11/2006 | Hill et al. | ........... | 1/1 |
| 7,146,610 B2 * | 12/2006 | Shen | ........... | 717/170 |
| 7,269,829 B2 | 9/2007 | Smith et al. | ........... | 717/168 |
| 7,275,059 B2 * | 9/2007 | Stakutis et al. | ........... | 709/203 |
| 7,324,450 B2 | 1/2008 | Oliver | ........... | 709/208 |
| 7,398,480 B2 * | 7/2008 | Zimniewicz et al. | ........... | 715/841 |
| 7,526,762 B1 * | 4/2009 | Astala et al. | ........... | 717/171 |
| 7,562,208 B1 * | 7/2009 | Reed et al. | ........... | 713/1 |
| 7,814,476 B2 * | 10/2010 | Ho | ........... | 717/169 |
| 7,849,455 B2 * | 12/2010 | Kadner et al. | ........... | 717/168 |

(Continued)

FOREIGN PATENT DOCUMENTS

| JP | 2003-316681 | 11/2003 |
|---|---|---|
| JP | 2004-46831 | 2/2004 |

OTHER PUBLICATIONS

Tsai et al, "FPGA based reconfigurable measurement intruments with functionality defined by user", ACM: Journal of Applied Signal Processing, pp. 1-14, 2006.*

(Continued)

*Primary Examiner* — Anil Khatri
(74) *Attorney, Agent, or Firm* — Trop, Pruner & Hu, P.C.

(57) ABSTRACT

In one embodiment, the present invention includes a method for determining if a system is compatible with an upgrade to a hardware resource of the system, receiving instructions from a remote server to upgrade the hardware resource if the system is compatible, and programming the hardware resource based on the instructions. In one such embodiment, the hardware resource may be programmed via programmable fuses to enable circuitry of the hardware resource. Other embodiments are described and claimed.

18 Claims, 5 Drawing Sheets

U.S. PATENT DOCUMENTS

| | | | |
|---|---|---|---|
| 7,865,888 B1 * | 1/2011 | Qureshi et al. | 717/168 |
| 7,917,894 B2 * | 3/2011 | Chen et al. | 717/124 |
| 7,996,814 B1 * | 8/2011 | Qureshi et al. | 717/120 |
| 8,087,014 B1 * | 12/2011 | Vassilovski et al. | 717/171 |
| 8,166,469 B2 * | 4/2012 | Milner | 717/168 |
| 2003/0110484 A1 | 6/2003 | Famolari | 717/173 |
| 2003/0159137 A1 | 8/2003 | Drake et al. | |
| 2004/0010643 A1 | 1/2004 | Thomas, III | 710/104 |
| 2004/0163081 A1 | 8/2004 | Martwick | 717/168 |
| 2005/0240919 A1 | 10/2005 | Kim et al. | 717/168 |
| 2006/0136893 A1 | 6/2006 | Blossom et al. | 717/168 |
| 2006/0195832 A1 | 8/2006 | Chandley et al. | 717/168 |

OTHER PUBLICATIONS

Kang et al, "Technology mapping and packing for coarse grained, anti fuse based FPGA's", IEEE, pp. 209-211, 2004.*

Rawashdeh et al, "A UAV test and development environment based on dynamic system reconfiguration", ACM pp. 1-7, 2005.*

Agron et al, "Building heterogenous reconfigurable systems with hardware microkernel", ACM CODES, pp. 393-402, 2009.*

German Patent Office, Office Action mailed Apr. 15, 2011 in German application No. 11 2006 001 308.4-53.

Japanese Patent Office, Office Action mailed May 17, 2011 in Japanese application No. 2008-513733.

Casselman, et al., "Net Aware BitStreams that Upgrade FPGA Hardware Remotely Over the Internet", Virtual Computer Corporation, 2001.

U.S. Appl. No. 10/404,784, filed Mar. 31, 2003, entitled "Method and Apparatus for Programming a Functionality of an Integrated Circuit (IC)" by Delton John Oliver.

UK Intellectual Property Office, Examination Report under Section 18(3) issued on Nov. 26, 2008 in a related foreign application.

State Intellectual Property Office, P.R. China, First Office Action dated Jan. 9, 2009, in a related application.

U.K. Intellectual Property Office, Examination Report Under Section 18(3) dated May 12, 2009, in a related application.

Korean Intellectual Property Office, Notice of Preliminary Rejection dated Sep. 11, 2009, in a related application.

State Intellectual Property Office, P.R. China, Office Action issued Jul. 28, 2011 in Chinese application No. 200680017842.1.

State Intellectual Property Office, P.R. China, Third Office Action issued Dec. 23, 2010 in Chinese patent application No. 200680017842.1.

* cited by examiner

IN-SYSTEM RECONFIGURING OF HARDWARE RESOURCES

This application is a continuation of U.S. patent application Ser. No. 11/135,158, filed May 23, 2005 now U.S. Pat. No. 7,640,541, entitled "IN-SYSTEM RECONFIGURATION OF HARDWARE RESOURCES," the content of which is hereby incorporated by reference.

BACKGROUND

Embodiments of the invention relate to hardware components used in computer systems and the like, and more particularly to the upgradeability of such components.

Many processor-based systems including personal computers (PCs), servers, personal digital assistants (PDAs), and cellular telephones among many others, include a mix of hardware and software components. Typically, a system includes a microprocessor, commonly referred to as a central processing unit (CPU), that handles a majority of processing operations, along with related components including, for example, memories and other storage media, chipsets and other processing devices, input/output (I/O) devices and the like.

End users typically use such systems for various processing, entertainment, communication and other activities. Oftentimes, a user will upgrade software components of a system, including an operating system (OS), application programs such as anti-virus programs, and the like. Furthermore, users may upgrade hardware of a system by downloading or otherwise installing new software (e.g., drivers or software patches) to control the hardware, adding new components such as additional memory, incorporating new devices such as advanced graphics cards and the like, or replacing older components such as a microprocessor or a hard disk drive with a new component. However, there are no post-point of sale upgrades available for hardware components within a previously configured system.

Oftentimes, hardware features of hardware components, such as a microprocessor, chipsets and the like, are years ahead of adoption of those features by a majority of users. For example, hardware features are often available and present in hardware components long prior to adoption of those features by software and/or maturity of software implementing such features. In other words, new hardware technology is introduced faster than software can adopt the technology, in many instances. Without software support and user demand for such hardware features, hardware components including these new hardware features oftentimes do not command a premium due to untapped technologies onboard.

Accordingly, a need exists to improve upgradeability of hardware features within systems.

DETAILED DESCRIPTION

Figure 1:
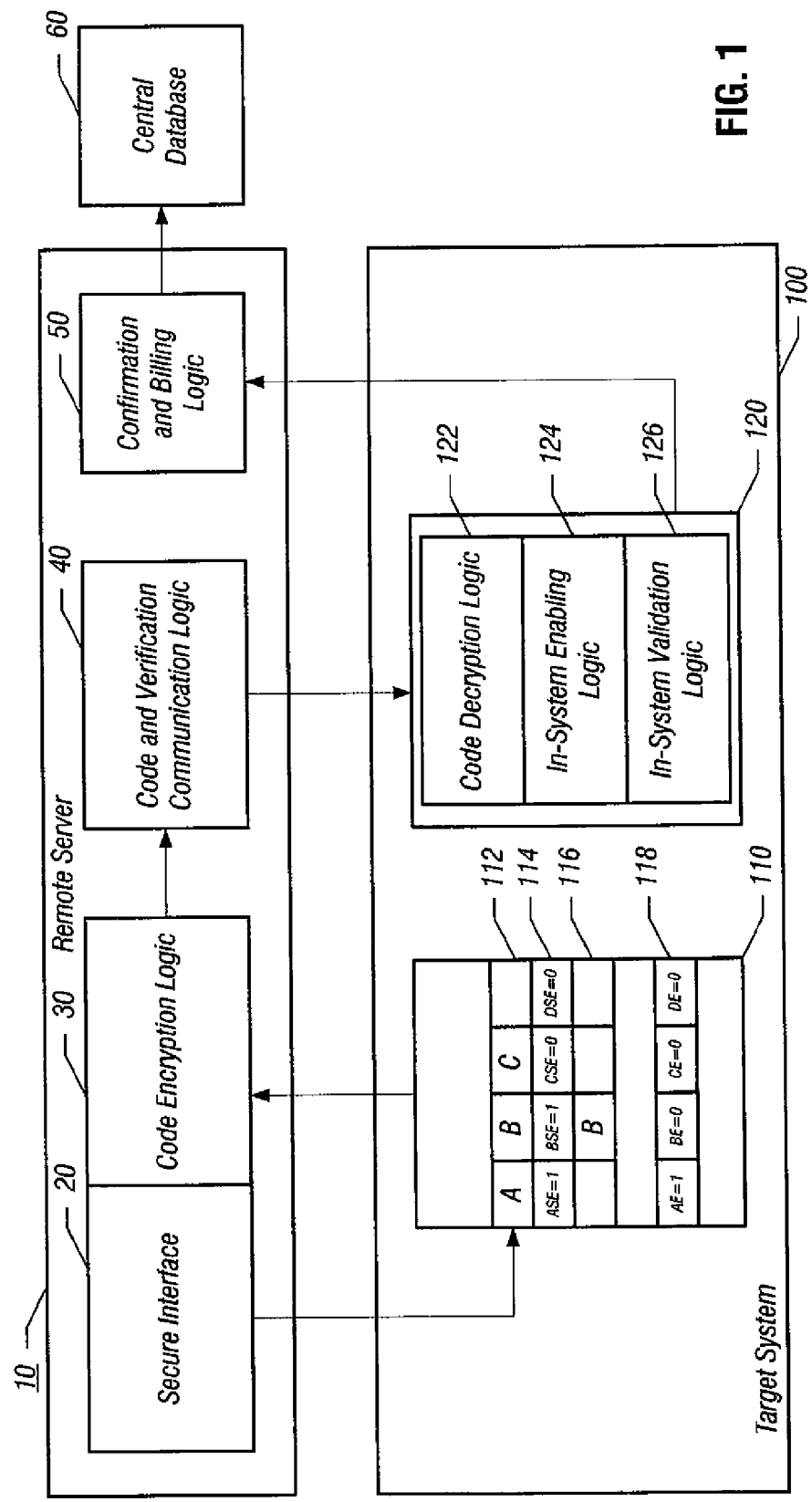
FIG. 1 is a block diagram of a system for performing hardware upgrades in accordance with one embodiment of the present invention.

Referring now to FIG. 1, shown is a block diagram of a system for upgrading one or more hardware features of a system. As shown in FIG. 1, the system includes a remote server 10 that communicates with a target system 100. As an example, remote server 10 may be a web server of an original equipment manufacturer (OEM) such as a manufacturer or reseller of PCs or other vendor. Alternately, remote server 10 may be associated with an independent vendor of hardware components. In yet other embodiments, remote sever 10 may be associated with an independent service provider, such as an authorized reseller of certain hardware components. While described herein as a remoter server, it is to be understood that in other embodiments a different type of system may be used to enable upgrades in accordance with an embodiment of the present invention.

Remote server 10 may communicate with target system 100 by various means including, for example, via the Internet or other network-based interconnection. In some embodiments, remote server 10 may include a secure interface 20 to communicate with target system 100. Secure interface 20 may use encryption technology such as that used for secure web-based financial or other transactions to communicate securely with target system 100.

In various embodiments, target system 100 may be a PC, server computer, PDA, cellular telephone or the like. Target system 100 may include various hardware and software components. In various embodiments, target system 100 may include a supported configuration table 110 that includes a plurality of machine status registers (MSRs) to indicate a status of different hardware features. In one embodiment, supported configuration table 110 may be within a microprocessor of target system 100 and may be used to indicate different hardware features of the microprocessor itself. In some embodiments, at least some of the information within supported configuration table 110 may be included in other portions of the processor. For example, other status registers may include information identifying particular capabilities of a processor so that appropriate software, microcode and the like can take advantage of the capabilities. However, information in such status registers is not visible to a remote server.

In other embodiments, supported configuration table 110 may be located in other portions of a target system, for example, a chipset component, a persistent memory or other location. Target system 100 may further include a reconfigurable logic block 120 to handle upgrade activities in accordance with an embodiment of the present invention.

During operation, remote server 10 may initiate a request for in-system reconfiguration of a hardware component. For example, remote server 10 may send a request to target system 100 to determine whether a user of system 100 desires to upgrade a hardware feature of a microprocessor. Remote server 10 may communicate with target system 100 in a variety of manners. For example, in some embodiments remote server 10 may send out broadcast communications to a number of systems, such as a broadcast transmission to all known target systems of a given model and/or configuration. For example, all model X's of an OEM that include a particular processor and/or a particular software image may be sent a broadcast packet.

In some embodiments, these broadcast packets may be sent transparently to target system 100 such that a user of the system is not aware of receipt of the packet. In these embodiments, the broadcast packet may include information to identify the sender of the packet, in addition to information to access supported configuration table 110. Specifically, the broadcast packet may include instructions for execution by a processor of target system 100 to access supported configuration table 110 to determine an upgrade status for a given hardware feature. For example, a broadcast packet may include a request by remote server 10 as to information regarding a hardware feature B. Accordingly, target system 100 may access supported configuration table 110 to determine whether an upgrade to enable feature B is compatible with target system 100. If it is, target system 100 may communicate such information to remote server 10. In some embodiments, this communication may also be transparent to a user of target system 100.

If remote server 10 thus confirms that a target system 100 is capable of being upgraded with respect to a feature B, remote server 10 may then send a communication to target system 100 to determine whether the user (or a responsible information technology (IT) manager) of target system 100 desires to upgrade its system with respect to feature B. In some embodiments the message may be a pop-up or other dynamic message. In these embodiments, to receive such a dynamic message, target system 100 may be enabled for dynamic upgrades. While the form of the message advising of the availability of an upgrade may take many forms, in some embodiments, a pop-up display such as that of conventional software/OS upgrade may be displayed. As an example, a message may report the availability of a feature B as follows: "Are you interested in enabling feature B for your Intel® Pentium®4 system?" "Click here for a demonstration of the benefits of this feature, enabling an array of usage models already available on your system". Then a demonstration may be presented describing the benefits of the feature, along with the cost. Then, a message such as "It takes less than X minutes to upgrade your existing PC for a cost of $Y" may be displayed. Based on the user response, a communication back to remote server 10 is made. In such manner, service providers may charge for the value at this post-point of sale time and thus realize a sell up opportunity.

The hardware feature may be any desired hardware circuitry to perform a given function. As examples and without limitation, in some embodiments hardware features to be upgraded may include processor speed, security features and the like. Other hardware features to be upgraded may include hyperthreading or other multiple threading technologies, virtualization technologies, 64-bit instruction computing, advanced technologies, and the like.

In some embodiments, remote server 10 may send the request to target system 100 using a secure interface 20. In turn, target system 100 may check to determine whether the system is upgradeable and what features are available for upgrade. As described above, in some embodiments, different registers of supported configuration table 110 may be examined to determine the upgrade status of the system.

As shown in FIG. 1, supported configuration table 110 may include a plurality of machine status registers (MSRs). In some embodiments, each of the MSRs may include multiple bits with each bit being associated with a different feature, although other control schemes are possible.

A first MSR 112 may be referred to as a product feature status register. Product feature MSR 112 may be set by a manufacturer of the hardware component (e.g., a processor manufacturer) to indicate whether the given hardware component includes circuitry corresponding to a given feature. In the embodiment shown in FIG. 1, product feature MSR 112 includes a plurality of bits. Bits A, B, and C are shown as set, indicating that the processor as manufactured includes circuitry for hardware features A, B and C. Of course in other embodiments, different configurations are possible and more than the illustrated number of features may be present.

Still referring to FIG. 1, supported configuration table 110 includes a second MSR 114, which may be referred to as a system feature MSR. System feature MSR 114 may report on what system support an OEM or other vendor has made available for the system as configured. That is, some features may require system level support such as additional hardware or software (e.g., OS features, drivers, additional hardware such as a trusted platform module (TPM) or an out-of-band (OOB) manageability engine). Accordingly, system feature MSR 114 may provide information on whether target system 100 as configured is capable of a seamless upgrade. In various embodiments, system feature MSR 114 may thus be written by an OEM or other system vendor, for example, during the manufacture of the system, to indicate the upgradeability of the target system for different hardware features. Accordingly, second MSR 114 may be used to provide certification/validation of a system for given hardware features. If a given feature is set in second MSR 114, target system 100 may reliably be interoperable with an upgrade to the given feature to support it in view of the various hardware and software of the given system.

Thus in various embodiments, systems may be certified at point of sale by an OEM, original device manufacturer (ODM) and/or an integrator as being upgradeable for certain classes of features. Such upgradeability may be provided based on the assumption that at a point of sale, a core model corresponding to a system may be available in multiple flavors, e.g., including various hardware and software components and levels of such components. Some users may desire to purchase the system with all features enabled, i.e., a top of the line system. However, other users may desire to purchase a system with a subset of all features available in hardware while ecosystem and usage models mature and ramp to mainstream users. Accordingly, based on a particular system's configuration, the vendor may set system feature MSR 114 accordingly at the point of sale.

In turn, an upgrade MSR 116 may indicate the features of the target component that are capable of being enabled in-system. In some embodiments, MSR 116 may be a post-point of sale upgrade MSR. That is, upgrade MSR 116 may indicate a logical AND operation between MSRs 112 and 114. Accordingly, as shown in FIG. 1, feature B is set in upgrade MSR 116, indicating a post-point of sale upgrade as to feature B.

Thus if target system 100 is capable of being upgraded and a user desires the upgrade, target system 100 and remote server 10 may cause the target system to be upgraded. In some embodiments, if a user has changed an OEM-provided image, before any hardware upgrades are allowed, the original image may be reinstalled to confirm that the hardware features may be enabled seamlessly. In other words, before remote server 10 is able to upgrade a target system 100, first target system 100 may have its original image reinstalled.

To effect the hardware upgrade, target system 100 may send an encryption key to remote server 10, along with the indication that hardware feature B is desired to be enabled and/or upgraded. In various embodiments, the system component to be upgraded (e.g., a CPU or chipset component) may provide a unique encryption key specific to target system 100. In some embodiments, the unique encryption key may be a product serial number or another unique identifier that is provided to uniquely identify each manufactured component.

By providing a unique identifier, compliance with antipiracy and other security mechanisms may be enforced.

Based on the information obtained from target system 100, remote server 10 may encrypt microcode instructions to enable feature B (for example) to be upgraded in target system 100. In the embodiment of FIG. 1, a code encryption logic block 30 within remote server 10 may be used to obtain the microcode to cause the upgrade and to encrypt the microcode according to the encryption key received from target system 100. Then remote server 10 may transmit the encrypted instructions via a code and verification communication logic block 40. In various embodiments, the information sent may include encrypted microcode instructions to enable the hardware feature(s), along with additional instructions for testing the target component to confirm a successful upgrade.

Still referring to FIG. 1, the encrypted instructions may be used by a reconfigurable logic block 120 of target system 100. Reconfigurable logic block 120 may include various components to effect feature upgrades. Specifically, as shown in FIG. 1, reconfigurable logic block 120 may include a code decryption logic 122 to decrypt the microcode sent by remote server 10. In various embodiments, code decryption logic 122 may use a decryption key corresponding to the encryption key transmitted by target system 100. Upon decrypting the microcode, an in-system enabling logic 124 may enable feature B. In various embodiments, fuse programmability logic may be used to enable the feature, as will be discussed further below.

Upon completing the enabling of the feature, an in-system validation logic 126 may confirm that the hardware feature was in fact successfully enabled. If it was, in-system validation logic 126 may set a corresponding feature bit within a feature enabled MSR 118 within supported configuration table 110 to indicate the enabled status. For example, FIG. 1 shows that feature enabled MSR 118 includes a logic "zero" in a bit corresponding to feature B. Upon a successful upgrade to provide for feature B, the bit corresponding to feature B may be set to a logic "one" state. Upon setting feature enabled MSR 118, target system 100 may send a confirmation message to a confirmation and billing logic block (confirmation block) 50 of remote server 10. In various embodiments, the confirmation message may further confirm that the hardware feature worked on target system 100. Accordingly, a validation message back to server 10 may include a signature confirming successful implementation of the hardware feature on target system 100. Accordingly, a user cannot later contend that the hardware feature was not successfully upgraded in an effort to avoid payment for the upgrade.

Upon receipt of the confirmation message, remote server 10 may charge an account associated with target system 100 for the successful upgrade. Furthermore, confirmation block 50 may send a status message to a central database 60 to indicate the upgrade to target system 100. In some embodiments, central database 60 may be a database associated with a component manufacturer, for example, a microprocessor manufacturer. In such manner, the manufacturer may track the actual configuration of specific processors for warranty and other purposes. For example, if a user has enabled a given hardware feature, a processor manufacturer may target the system for further upgrades, software or other components to provide for accessories suitable for use with the given hardware feature upgrade. Still further, the processor manufacturer may use information regarding upgrades effected by particular users or selection of upgrades overall, to extract marketing information for use in developing future products and upgrades.

While shown in FIG. 1 as being implemented with a remote server 10, in other embodiments upgrades to target system 100 may occur in other manners. For example, a user may purchase a disk or other storage medium containing instructions to implement upgrades in accordance with an embodiment of the present invention.

Figure 2:
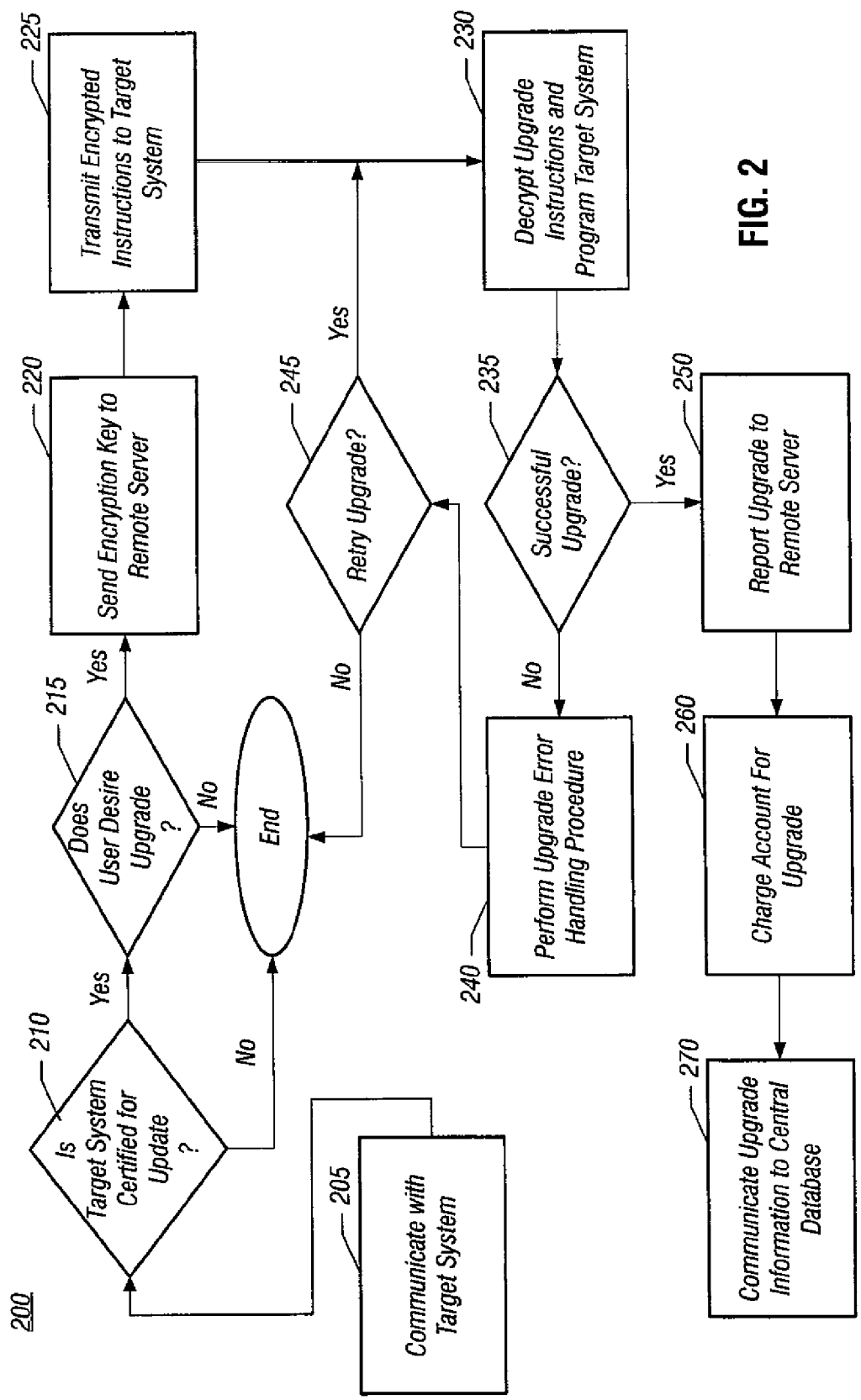
FIG. 2 is a flow diagram of a method in accordance with one embodiment of the present invention.

Referring now to FIG. 2, shown is a flow diagram of a method in accordance with one embodiment of the present invention. As shown in FIG. 2, method 200 may be used to upgrade a hardware feature of a target system. Method 200 may begin by communicating with a target system (block 205). For example, a remote server of an OEM, reseller or the like may communicate with the target system. In various embodiments, the communication may be transparent to a user of the system. Specifically, the remote server may request information regarding a configuration of the target system so that a determination may be made as to whether the system is able to be upgraded.

Accordingly, it may be determined whether the target system is certified for an upgrade (diamond 210). In various embodiments, information in a supported configuration table may be communicated back to the remote server upon a request by the remote server. Again, this communication between the remote server and the target system may be transparent to an end user. Based on the information received from the target system, the remote server may determine that the target system is not certified for an upgrade. If it is not certified, method 200 may be terminated.

If it is determined that the target system is certified for an upgrade, next it may be determined whether the user desires to upgrade the system (diamond 215). While various manners of determining whether a system is desired to be upgraded may exist, in many embodiments a message from the remote server to the target system may be sent. The message may be caused to be displayed on the target system, for example, via a pop-up or other message block to indicate availability of the upgrade. If the user does not desire the upgrade, method 200 may be terminated.

If instead a user desires the upgrade, the target system may send an encryption key to the remote server (block 220). In various embodiments, the encryption key may be a unique code that identifies the target system and/or a particular hardware component of the system, e.g., a processor or chipset.

Using the encrypted key, the remote server may generate encrypted instructions to enable the upgrade. More specifically, the remote server may generate microcode instructions and furthermore may encrypt the instructions to prevent unauthorized access to the instructions. The microcode instructions may be used by the target system to appropriately program one or more hardware components to enable the feature(s) for operation. The remote system may also generate validation instructions for transmission to the target system to confirm that the upgrade was successful and that the target system can perform code that implements the desired feature. Accordingly, the remote server may transmit encrypted upgrade instructions to the target system (block 225).

Using a decryption key corresponding to the encrypted instructions, the target system may decrypt the upgrade instructions and program the target system accordingly (block 230). Specifically, decrypted microcode instructions may be used to securely allow upgrades to occur with less concern for security breaches. That is, microcode instructions may be decrypted and sent directly to a processor core, where the microcode instructions may be executed internally to initiate programming. Because the transmitted instructions may be in microcode in these embodiments, the ability of a user to extract the instructions or to provide the instructions to unauthorized parties may be significantly reduced.

In some embodiments, the microcode instructions may be executed by the processor to initiate the programming of the feature(s) to be upgraded. For example, in some embodiments the microcode instructions may initiate dynamic fuse programming logic within a processor or other hardware component to burn one or more fuses to enable a path to circuitry previously unavailable. In these embodiments, the dynamic fuse programming logic may cause a source voltage to be provided to a fuse bank or the like to cause the selected fuses to be burned (i.e., enabled). Upon successful burning, a path may then be made to circuitry that performs the feature.

After programming the component to enable the feature, next it may be determined whether the upgrade was successful (diamond 235). In various embodiments, code transmitted by the remote server may be used to verify operation of the enabled feature. For example, in some embodiments validation code may be sent along with the microcode instructions. Upon completion of the programming, the target system may execute the validation code. The validation code may exercise the newly enabled circuitry to verify that it operates for its intended purpose, and more specifically to verify that it operates in the specific configuration of the target system.

If it is determined that the upgrade was not successful (diamond 235), control may pass to block 240, where an error handling procedure may be performed. In various embodiments, error handling code may be implemented on the target system to handle the error. In some embodiments, the error handling procedure may be downloaded from the remote source. After the error handling code is performed, it may then be determined whether to retry the upgrade process (diamond 245). For example, if the error handling routine corrected the error, the upgrade process may be reattempted. Alternately, it may be determined to not effect the upgrade at the present time, at which point method 200 may be terminated. If the upgrade is to be retried, control returns to block 230.

If instead at diamond 235 it is determined that the upgrade was successful, the upgrade may be reported to the remote server (block 250). Specifically, information from the supported configuration table may be sent to the remote server to indicate successful completion of the upgrade. In addition to the information from the supported configuration table, information identifying the target system may be included so that the remote server can take appropriate measures.

Specifically, the remote server may charge an account associated with the target system for the upgrade (block 260). For example, an IT department of an enterprise may maintain an account with the OEM that implements the remote server. In other embodiments, different measures of paying for upgrades may be possible. For example, in some embodiments, an individual end user may provide credit card information to authorize billing charges for an upgrade desired by the end user.

In addition to billing for the upgrade, the remote server may store information regarding the upgrade including, for example, information regarding the identification of the target system, the upgrades effected, and additional information about the target system, such as platform, build, image, and the like. Further, as shown in FIG. 2, the remote server may communicate the upgrade information to a central database (block 270).

Figure 3:
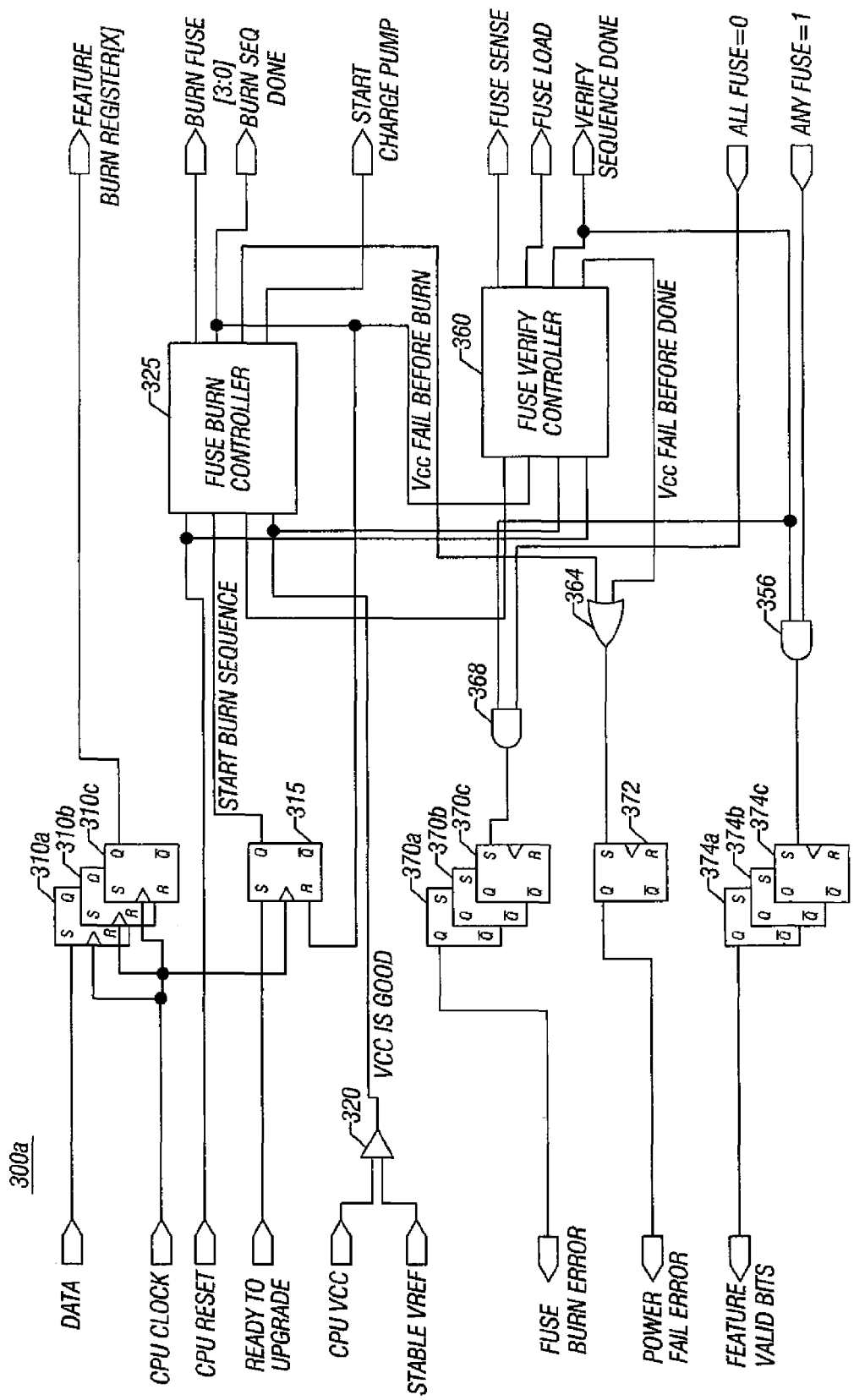
FIG. 3 is a block diagram of a first portion of dynamic fuse programming circuitry in accordance with one embodiment of the present invention.

Referring now to FIG. 3, shown is a block diagram of a portion of dynamic fuse programming logic in accordance with one embodiment of the present invention. As shown in FIG. 3, circuit 300a may include various registers, logic gates, and controllers to control burning of fuses to enable different hardware features. As shown in FIG. 3, circuit 300a is coupled to receive data to burn fuses. Data may be transmitted to circuit 300a under control of microcode instructions received from a remote server. As shown in FIG. 3, the incoming data may be received at a plurality of latches 310a, b, c. In various embodiments, a one-bit latch may be used to receive data for each feature that can be upgraded. While shown for ease of illustration in FIG. 3 as including three such latches, it is to be understood the scope of the present invention is not so limited. Latches 310 are coupled to be clocked by an incoming clock signal, for example, a processor clock signal (CPU Clock). The incoming clock signal may also be used to clock a control latch 315 that is coupled to receive a control signal. Specifically, the control signal (i.e., ReadyToUpgrade) may be received from executed microcode instructions.

To control burning of selected fuses, a fuse burn controller 325 may be present. In various embodiments, controller 325 may be programmable logic to initiate a fuse burning sequence. In the embodiment of FIG. 3, controller 325 is coupled to receive a reset signal (i.e., CPU Reset) and a control signal (i.e., StartBurnSequence) to initiate a fuse burn sequence from latch 315. Furthermore, controller 325 is coupled to receive the incoming clock signal. Finally, as shown in FIG. 3, controller 325 is coupled to receive a voltage status signal (VCCIsGood). The voltage status signal may be output by a comparator 320, which compares a processor supply voltage (CPU VCC), for example, to a reference voltage. In the embodiment shown in FIG. 3, the reference voltage (i.e., Stable VREF) may be approximately equal to two thirds of the supply voltage.

Upon initiation of the control signal (i.e., StartBurnSequence) and assuming the reset signal has been received and the voltage status signal is active, controller 325 may cause burning of the selected fuses. More specifically, controller 325 first may set an initiate charge control signal (i.e., StartChargePump). Then, on succeeding clock cycles (e.g., 1 microsecond (μs) cycles of the CPU Clock), controller 325 may set a signal for each of a plurality of redundant fuses for the selected feature. As shown in FIG. 3, the sent signals may issue on a plurality of lines (i.e., BurnFuse [3:0]). When the burn sequence is done, a burn sequence conclusion control signal (i.e., BurnSeqDone) may be generated. Then controller 325 may set all of its outputs to zero.

Figure 4:
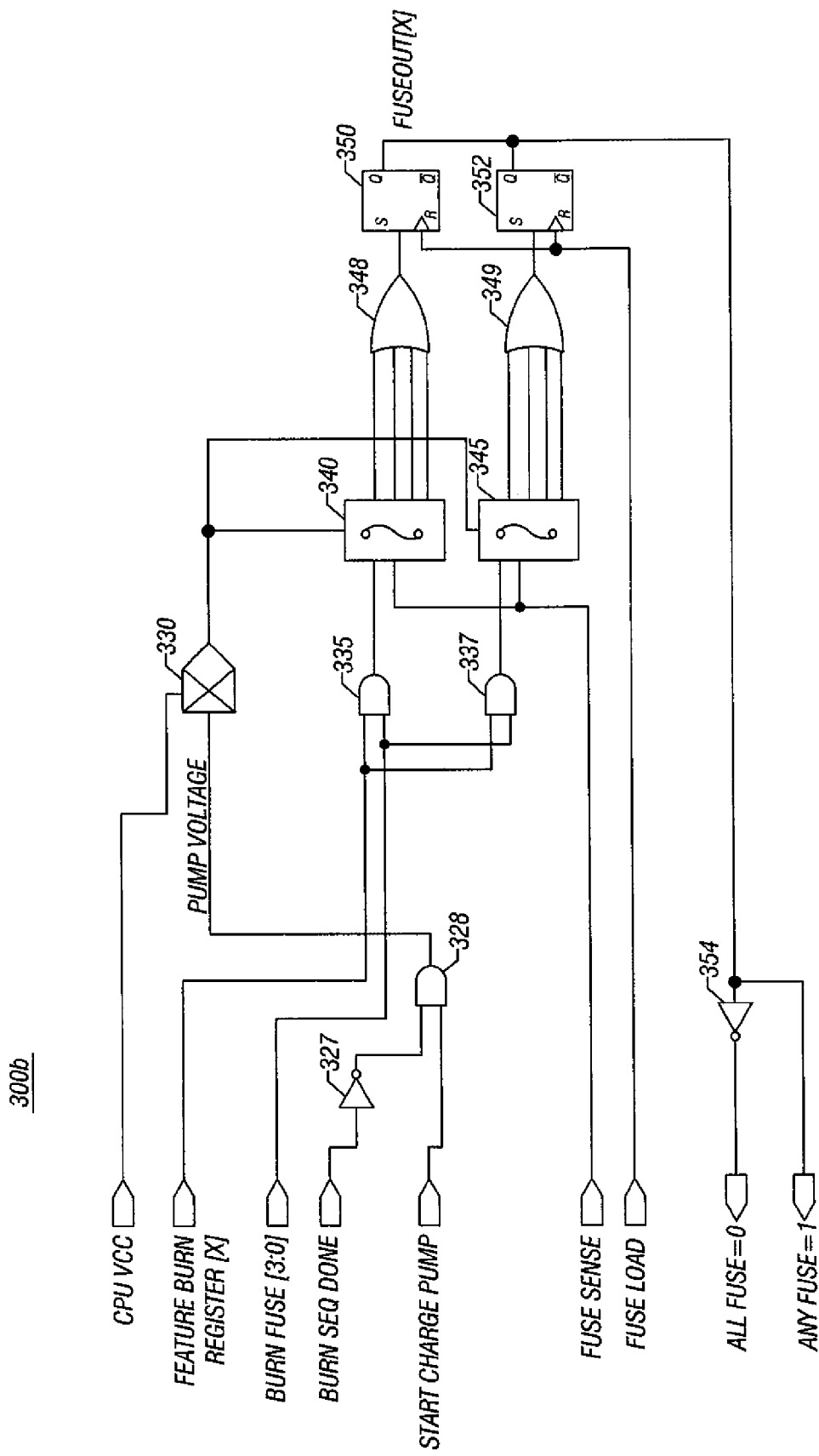
FIG. 4 is a block diagram of a second portion of the dynamic fuse programming circuitry of FIG. 3.

Directing attention now to FIG. 4, shown is a second portion of dynamic fuse programming logic in accordance with an embodiment of the present invention. As shown in FIG. 4, circuit 300b may be part of the same logic as circuit 300a.

As shown in FIG. 4, circuit 300b includes a charge pump 330 that generates a fuse burning voltage when activated. Charge pump 330 is coupled to receive a supply voltage (CPU VCC) and an enable signal (PumpVoltage) that is output from an AND gate 328. As shown in FIG. 4, AND gate 328 is coupled to receive the charge control signal and an inverted burn sequence conclusion control signal, i.e., via an inverter 327. Thus when the output of AND gate 328 is a logic "one" and the supply voltage is present, charge pump 330 may generate a charge pump voltage signal (ChargePumpOut) to provide a fuse burning voltage to a first fuse bank 340 and a second fuse bank 345. While shown in the embodiment of FIG. 4 as receiving a source voltage from the processor supply voltage (i.e., CPU VCC), in other embodiments an auxiliary voltage supply may be used. Furthermore instead of using a pumped up voltage via charge pump 330, a dedicated platform source voltage may be used. Alternately, a nominal supply voltage (e.g., CPU VCC) may be used in other embodiments.

While shown in the embodiment of FIG. 4 as including only two fuse banks, it is to be understood the scope of the present invention is not so limited, and any desired number of fuse banks may be present in a given embodiment. In various embodiments, each fuse bank may be a bank of redundant fuses (e.g., four redundant fuses) with separate burn control for each fuse. Furthermore, in various embodiments a fuse bank may be present for each potential feature to be enabled or upgraded. However, it is to be understood that other configurations are possible.

To burn the selected fuses in a given fuse bank, an incoming signal on a line corresponding to a selected fuse within the bank may be at a logic high level. Specifically, as shown in FIG. 4 logic gates 335 and 337 (i.e., AND gates) are coupled to a data input of fuse banks 340 and 345 respectively. AND gates 335 and 337 are coupled to receive a feature burn selection signal (FeatureBurnRegister[X]) from latches 310 and a fuse burn signal from controller 325. When a logic high level is output from one of AND gates 335 and 337, and the charge pump voltage signal is present, the appropriate fuse will be burned. In such manner, a plurality of redundant fuses corresponding to a given hardware feature may be set under control of instructions (e.g., microcode instructions).

Still referring to FIGS. 3 and 4, circuitry 300a and 300b may also be used to verify that a fuse burning sequence was properly performed. Accordingly, a fuse verify controller 360 may be present (in circuit 300a). As shown in FIG. 3, controller 360 may be coupled to receive various inputs including the incoming clock signal, the voltage status signal, and the reset signal. Furthermore, controller 360 may be coupled to receive the burn sequence conclusion signal from controller 325. In various embodiments, controller 360 may be idle with all of its outputs set to zero until it receives an active high burn sequence conclusion signal, indicating the completion of a burn sequence.

At such time, controller 360 may perform the following functions, in one embodiment. First, controller 360 may set a fuse sense signal (Fuse Sense) to a logic high. Then it may set a fuse load signal (Fuse Load) to an active high value. When the fuse sense signal is active, fuse banks 340 and 345 will generate outputs to indicate the burn status of each of the individual fuses within each bank. These output signals are then in turn logically ORed via OR gates 348 and 349, the outputs of which are coupled to respective latches 350 and 352. When these latches are enabled by the fuse load signal, the latches will output a fuse output signal (FuseOut[x]).

As shown in FIG. 4, via an inverter 354, the fuse output signal is inverted to thus form an all fuse signal (AllFuse=Zero) and an uninverted any fuse signal (AnyFuse=One). Referring to FIG. 3, an AND gate 356 (i.e., an AND gate) is coupled to receive the any fuse signal, along with a verify sequence conclusion signal (VerfySequenceDone) generated by fuse controller 360. When both of these signals are set at a logic high, AND gate 356 generates a high output that is provided to a respective one of latches 374a, b, c, each corresponding to a respective hardware feature. When one of latches 374 generates a feature valid bit (FeatureValidBits), this indicates that the corresponding hardware feature had its fuses successfully programmed.

In contrast, if the all fuse signal is at a logic high level and the verify sequence conclusion signal from controller 360 is also at a logic high, an AND gate 368 may generate an output high signal to provide a value to a corresponding one of latches 370a, b, c, each of which also corresponds to a given feature. If one of these latches 370 outputs a logic high signal, it indicates that a fuse burn error occurred in attempting to program the given hardware feature. Finally, an OR gate 364 may be coupled to receive a power supply failure signal. Specifically, two such power supply failure signals, namely a VCCFailBeforeBurn signal from fuse burn controller 325 and a VCCFailBeforeDone signal from fuse verify controller 360 may be provided to the inputs of an OR gate 364. If either of these signals is set high, indicating a supply voltage failure, OR gate 364 will output a logic high signal. This in turn sets a latch 372 to indicate a power failure error.

The feature valid bit (e.g., via one of latches 374a, b, c) may be used to set the feature enabled MSR 118 of supported configuration table 110, in various embodiments. For example, if a fuse bank for a feature B was successfully programmed, a corresponding bit for feature B within feature enabled MSR 118 may be set. In turn, target system 100 may send a message to remote server 10, indicating the successful programming of the selected feature.

Thus in various embodiments, hardware features may be implemented in hardware components at time of manufacture and users post-point of sale may choose to take advantage of one or more hardware features. According to various embodiments of the present invention, a safe/secure manner of enabling features and validating their functionality in target systems may be provided. Such upgrades may provide a value add to OEMs, IT customers, and end users. Furthermore, hardware manufacturers, OEMs and others may generate additional revenues by providing for later upgrade of features already implemented within hardware, but not enabled at point of sale. Also, end users upon upgrading hardware features may more rapidly speed their upgrade plans to even higher end platforms, thus reducing the PC replacement cycle.

Also, a user may avoid paying top-dollar for a system at point of purchase, but still have the flexibility and ability to later upgrade provisioned hardware features. For example, when certain applications/usage models become more mature, a user may choose to then upgrade one or more hardware components to provide for further hardware features.

Embodiments may be implemented in a computer program. As such, these embodiments may be stored on a storage medium having stored thereon instructions which can be used to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic RAMs (DRAMs), erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device, such as a computer processor or a custom designed state machine.

Figure 5:
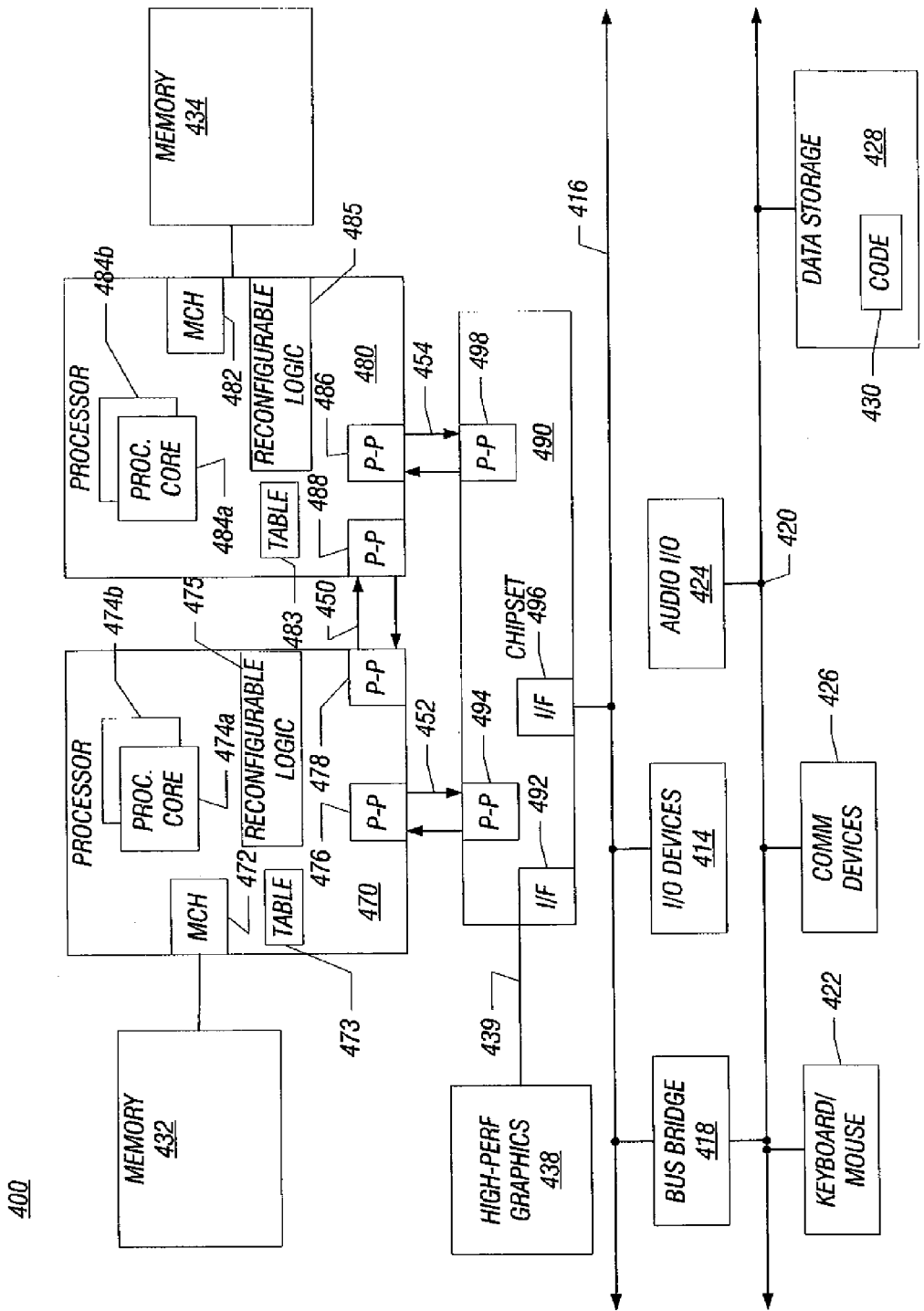
FIG. 5 is a block diagram of a system in accordance with an embodiment of the present invention.

Embodiments may be implemented in different systems. For example, some embodiments may be implemented in a multiprocessor system (e.g., a point-to-point bus system such as a common system interface (CSI) system). Referring now to FIG. 5, shown is a block diagram of a multiprocessor system in accordance with an embodiment of the present invention. As shown in FIG. 5, multiprocessor system 400 is a point-to-point bus system, and includes a first processor 470 and a second processor 480 coupled via a point-to-point interconnect 450. As shown in FIG. 5, each of processors 470 and 480 may be multicore processors, including first and second processor cores (i.e., processor cores 474a and b and processor cores 484*a* and *b*). First processor 470 further includes a memory controller hub (MCH) 472 and point-to-point (P-P) interfaces 476 and 478. Similarly, second processor 480 includes a MCH 482, and P-P interfaces 486 and 488. As shown in FIG. 5, MCH's 472 and 482 couple the processors to respective memories, namely a memory 432 and a memory 434, which may be portions of main memory locally attached to the respective processors.

As shown in FIG. 5, processor 470 may include a table 473 in accordance with an embodiment of the present invention. More specifically, table 473 may be a supported configuration table that includes a plurality of MSRs to identify hardware features and their upgrade status. Furthermore, processor 470 may include reconfigurable logic 475 in accordance with an embodiment of the present invention. Reconfigurable logic 475 may be used to receive instructions from a remote server and enable in-system one or more hardware features according to the instructions. As further shown in FIG. 5, processor 480 may similarly include a table 483 and reconfigurable logic 485 in accordance with an embodiment of the present invention.

First processor 470 and second processor 480 may be coupled to a chipset 490 via P-P interfaces 452 and 454, respectively. As shown in FIG. 5, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the *Accelerated Graphics Port Interface Specification*, Revision 2.0, published May 4, 1998, by Intel Corporation, Santa Clara, Calif. Alternately, a point-to-point interconnect 439 may couple these components.

In turn, chipset 490 may be coupled to a first bus 416 via an interface 496. In one embodiment, first bus 416 may be a Peripheral Component Interconnect (PCI) bus, as defined by the *PCI Local Bus Specification, Production Version, Revision* 2.1, dated June 1995 or a bus such as the PCI Express bus or another third generation I/O interconnect bus, although the scope of the present invention is not so limited.

As shown in FIG. 5, various input/output (I/O) devices 414 may be coupled to first bus 416, along with a bus bridge 418 which couples first bus 416 to a second bus 420. In one embodiment, second bus 420 may be a low pin count (LPC) bus. Various devices may be coupled to second bus 420 including, for example, a keyboard/mouse 422, communication devices 426 and a data storage unit 428 which may include code 430, in one embodiment. Communication devices 426 may include a network interface card, a wireless interface and the like to enable system 400 to communicate with a remote system to receive upgrade instructions. Further, an audio I/O 424 may be coupled to second bus 420.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
 a processor to execute instructions, the processor including a plurality of hardware features, wherein at least one of the hardware features is to be enabled after a point of sale of a system including the processor, the processor further including:
  a first status register having a plurality of indicators each to store information regarding a system support status for one of the hardware features, wherein each indicator is of a first state to certify that the system as configured by a vendor of the system is able to support one of the hardware features;
  a second status register having a plurality of indicators each to store information regarding a feature enable status for one of the hardware features, wherein each indicator is of a first state to indicate presence of circuitry in the processor corresponding to one of the hardware features; and
  a third status register having a plurality of indicators each to store information regarding an upgraded status for one of the hardware features, wherein one of the indicators of the third status register is to be set upon successful enabling of a corresponding one of the hardware features, wherein the processor is to access a feature table comprising a centralized storage for status information available in the first, second and third status registers.

2. The apparatus of claim 1, further comprising a dynamic fuse programming logic to program the processor to enable at least one of the hardware features, wherein the dynamic fuse programming logic comprises a fuse burn controller to burn at least one fuse to enable the at least one of the hardware features.

3. The apparatus of claim 2, wherein the dynamic fuse programming logic is to program the processor according to microcode received from a remote source to enable the at least one of the hardware features.

4. The apparatus of claim 2, further comprising a fuse verify controller to verify the burn.

5. The apparatus of claim 4, wherein a block of the processor is to perform the at least one of the hardware features, the block coupled to a processor core via the at least one fuse.

6. The apparatus of claim 1, wherein information of the feature table is to be communicated to an external system.

7. A system comprising:
 a processor including a hardware feature that is unenabled at a point of sale of the system;
 a programmer coupled to the hardware feature to enable the hardware feature post-point of sale and including dynamic fuse programming logic to enable the hardware feature according to instructions received from a remote system; and
 an interface to connect the system to the remote system to provide a communication of information obtained from a first status register having a plurality of indicators each to store information regarding a system status for a corresponding hardware feature to certify whether the system as configured by a vendor of the system is able to support the hardware feature, a second status register having a plurality of indicators each to store information regarding a feature enable status for a corresponding hardware feature to indicate presence of circuitry in the processor corresponding to the hardware feature, and a third status register having a plurality of indicators each to store information regarding an upgraded status for one of the hardware features, wherein one of the indicators of the third status register is to be set upon successful enabling of a corresponding one of the hardware features, wherein the processor is to access a feature table of the system including the first, second and third status registers.

8. The system of claim 7, wherein the dynamic fuse programming logic includes a controller to burn at least one fuse to couple the hardware feature to a processor core.

9. The system of claim 7, wherein the system is to receive a first communication from the remote system to request information regarding a configuration of the system.

10. The system of claim 9, wherein the system is to send a second communication to provide the information from the system to the remote system to indicate that the system is qualified to enable the hardware feature.

11. The system of claim 7, further comprising the feature table of the system including the first, second and third status registers.

12. The system of claim 7, wherein the hardware feature comprises a security feature.

13. An article comprising a non-transitory machine-readable storage medium containing instructions that if executed by a system enable the system to perform a method comprising:
   first communicating from the system to a target system to request information regarding a configuration of the target system;
   determining that the target system is qualified to upgrade a hardware component of the target system by analysis of the information, obtained from a feature table of the target system and communicated from the target system to the system responsive to the first communicating;
   communicating from the system to the target system a second request to determine whether a user of the target system desires the upgrade, and if so, receiving an encryption key from the target system for use in generating upgrade instructions; and
   preparing and transmitting the upgrade instructions to the target system from the system, the upgrade instructions to cause the target system to program the hardware component to enable the upgrade.

14. The article of claim 13, wherein the method further comprises providing validation instructions to the target system from the system, the validation instructions to be executed using a feature of the hardware component enabled by the upgrade instructions to confirm that the upgrade to the target system was successful.

15. The article of claim 13, wherein the method further comprises:
   charging an account associated with the target system for the upgrade upon confirmation that the upgrade was successful; and
   recording information regarding the target system and the upgrade in a central database accessible by a manufacturer of the hardware component.

16. The article of claim 13, wherein the method further comprises preparing and transmitting the upgrade instructions in an encrypted manner according to the encryption key received from the target system.

17. The article of claim 13, wherein the first communicating and the information communication are performed transparent to a user of the target system.

18. The article of claim 13, wherein the first communicating is of a broadcast communication to a plurality of target systems.

* * * * *